United States Patent [19]

Knorr et al.

[11] 4,067,600

[45] Jan. 10, 1978

[54] TRACK WHEEL HAVING A LIGHTWEIGHT CONSTRUCTION

[75] Inventors: Walter Knorr; Helmut Licht, both of Bochum; Erwin Raquet, Sprockhovel; Walter Spieker, Duisburg-Hamborn, all of Germany

[73] Assignee: Fried. Krupp Huttenwerke AG, Bochum, Germany

[21] Appl. No.: 600,031

[22] Filed: July 29, 1975

[30] Foreign Application Priority Data

Aug. 10, 1974 Germany .............................. 2438550

[51] Int. Cl.² ............................................. B60B 17/00
[52] U.S. Cl. .................................. 295/23; 301/63 DD
[58] Field of Search ........................... 295/7, 8, 21–23, 295/25–28, 30, 24; 301/63 R, 63 DD, 63 DT, 63 D, 63 DS

[56] References Cited

U.S. PATENT DOCUMENTS

| 99,210 | 1/1870 | Komp | 295/22 |
| 236,525 | 1/1881 | Absterdam | 295/23 |
| 290,518 | 12/1883 | Boies | 295/22 |

FOREIGN PATENT DOCUMENTS

| 1,134,672 | 12/1956 | France | 295/21 |
| 320,683 | 1/1919 | Germany | 301/63 DD |
| 1,277,294 | 9/1968 | Germany | 295/23 |
| 117,111 | 3/1944 | Sweden | 295/16 |
| 5,439of | 1896 | United Kingdom | 295/7 |

*Primary Examiner*—Robert B. Reeves
*Assistant Examiner*—H. Grant Skaggs
*Attorney, Agent, or Firm*—Burgess, Dinklage & Sprung

[57] ABSTRACT

A wheel of lightweight construction useful as a wheel for a railroad car having a hub portion and a rim portion. The hub portion is connected to the rim portion by a pair of spaced apart opposed concavely shaped wheel discs positioned back-to-back. Each of the wheel discs has a main portion running between the hub and the rim. The main portion has integral therewith at each end thereof an arcuately shaped transitional portion which terminates in an edge. One of these transitional portions contiguously abuts and is affixed to one of two oppositely inclined flanks of the hub. The other of the transitional portions contiguously abuts and is affixed to one of two oppositely inclined flanks of the rim.

11 Claims, 3 Drawing Figures

TRACK WHEEL HAVING A LIGHTWEIGHT CONSTRUCTION

BACKGROUND OF THE INVENTION

Field of the Invention

This invention relates to a track wheel useful for railway cars and the like having a light-weight construction in which the wheel hub and the wheel rim are connected to one another via a double-walled wheel disc. In accordance with this invention there is provided a track wheel wherein the hub portion and the rim portion are connected together by a double-walled wheel disc, each wall of which has a cup-shaped configuration in the radial-axial plane. Each of the disc portions which form the double wall comprises a main portion to which there is integral therewith a curved transitional portion, in turn integral with a flank portion terminating in an edge. Each wall regularly passes from a central part of the wheel disc into the edges, the edge regions being supported on the hub/wheel rim or the wheel rim and being affixed thereto.

It has heretofore been proposed to provide railroad track wheels wherein the portion joining the hub and the rim comprises a multi-walled structure. The problem with track wheels having a double-walled wheel disc resides in that the connections heretofore provided for the walls to the wheel hub and particularly to the wheel rim have been inadequate. Attempts have been made to weld the walls entering substantially perpendicular into the wheel hub and the wheel rim, but practice has shown that such welding seams break, particularly in the region of the wheel rim (Hans-Kurt Obst "Die Entwicklung von Leichtradsaetzen fuer Eisenbahnwagen" 1969 in "Eisenbahntechnislhe Praxis," No. 4, October 1969).

In a known track wheel having a lightweight construction of the type described above, the outer sides of the double-walled disc have had a convex curve. Both the inner and outer regions of the disc, by which the disc is supported at the hub and the rim, have been arranged concentrically to the wheel axis as far as a narrow running conically. The welding seams in the region of the edges at the wheel hub in such a case are especially susceptible to rupture, as when the wheel is sprung the edge regions act as lever arms and load the welding seams with a radial force. Consequently, the high stress already prevailing in these regions is raised to dangerous and even breaking levels.

It has become desirable to provide a railroad track wheel having a lightweight construction having a double-walled wheel disc joining the wheel hub and the wheel rim inasmuch as such lightweight track wheels are superior to track wheels having a one-walled wheel disc, in that they can be manufactured so that the total disc thickness of the discs is smaller but the rigidity the same. It has become desirable to provide such a multi-walled wheel disc wherein the walls joining the hub and the rim can be safely secured to the hub and rim without employing a weld which will readily break under conditions of use. More particularly, it has become desirable to provide an alternate multi-walled track wheel wherein the walled disc joining the hub and the rim is replaced by a concavely shaped disc.

SUMMARY OF THE INVENTION

The objects of the invention are provided, in accordance with this invention, by a wheel useful as a railroad car wheel, which wheel has a hub portion and a rim portion, the hub portion connected to the rim portion by a pair of opposed concavely shaped wheel discs positioned back-to-back, each of which comprises a main portion running between said hub and said rim, which main portion has integral therewith at each end thereof an arcuately shaped transitional portion terminating in an edge, one of said transitional portions contiguously abutting and affixed to one of two oppositely inclined flanks of said hub, the other of said transitional portions contiguously abutting and affixed to one of two oppositely inclined flanks of said rim.

The multi-walled construction of the present invention utilizes a wheel disc, each of the walls of which is concavely shaped. Each wall has a main ring portion which on either side thereof leads gradually into an arcuately shaped transitional portion terminating in an edge. The walls are positioned back-to-back to one another leaving a space therebetween. This space can be filled with a synthetic material, preferably a lightweight synthetic material as described below. The lightweight track wheel of the invention not only safely joins the wheel hub to the wheel rim in such a way that the member joining the same does not act as a lever arm, but also counteracts the operating loads so as not to produce any danger of rupture when the wheel is in use.

As seen from the description below, at the heart of the invention there is the use of arcuately shaped transitional portions leading from a main portion of the wall which can engage a correspondingly arcuately shaped flank on the wheel hub or the wheel rim. Preferably, the flanks of the wheel hub and the wheel rim each have a parabolic shape, the parabolas of which face one another. This allows for the disposition of a lightweight wheel disc wall on each of the curved surfaces of the hub and the rim. Preferably, the flanks of the hub and the rim each have a cut-out so as to permit the transitional portions of the walls to rest securely in and be held by the hub and the rim. This allows for the use of a filling material between the walls which is lightweight.

In the track wheel of the invention, the flanks of the wheel hub and the wheel rim support the wheel disc both in the region of the transitional portions (between the main or central portion and the edges thereof) and also in the region of the edges, so that even these regions, particularly in danger of rupture, are protected from overloading. If the edges are welded with the hub or the wheel rim, the welding seams are not stressed in practice because all of the stresses are received in the region of the plane construction between the transitional portions and the inclined flanks.

The flanks preferably have peripheral steps at which the walls are supported by their edges. In order to anchor the walls in the grooves, the step can be undercut. In order to impart self-supporting characteristics to the walls, they can be supported at the flanks by their transitional portions and edges through the use of spring tensioning.

Preferably, the walls are affixed to the hub and the rim by welding the flanks thereto. In contrast to the wheels of the prior art, the weld seams are no longer in the region of greatest stress but are removed from this region. In order to attain a length as long as possible, the weld seams can run in waves.

As an alternative to being fixed by means of a weld seam, the walls can also be screwed or otherwise stuck to the flanks in the region of its plane connections, i.e., the flank portions integral with the walls can be adhesively or mechanically secured to the hub or the wheel without the use of a weld.

In order to improve the rigidity of the wall-coupled disc and to protect the disc from corrosion and further to deaden noises, a filling material can be provided in the cavity between the walls. The rigidity of the wheel disc in the axial and tangential direction can be further influenced so that the walls are undulated in the tangetial and/or radial direction.

BRIEF DESCRIPTION OF DRAWINGS

In order to more fully illustrate the invention, reference is made to the accompanying drawings in which.

DESCRIPTION OF SPECIFIC EMBODIMENTS

Figure 1:
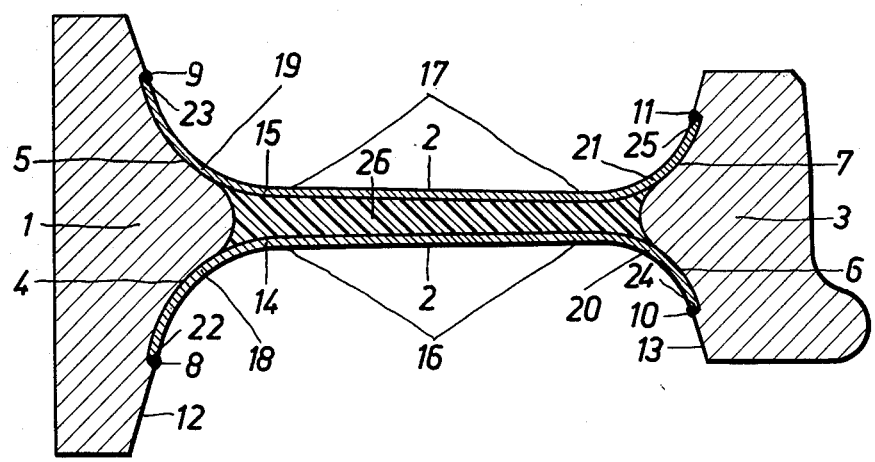
FIG. 1 is a side sectional elevation showing an axial section through a track wheel having a non-undulated wheel disc.
Figure 2:
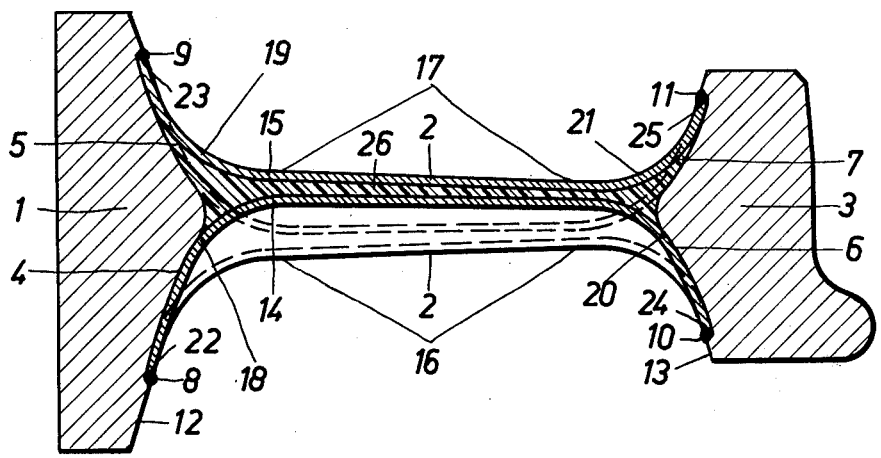
FIG. 2 is a view similar to FIG. 1 showing an axial section through a track wheel having a tangentially undulated wheel disc.
Figure 3:
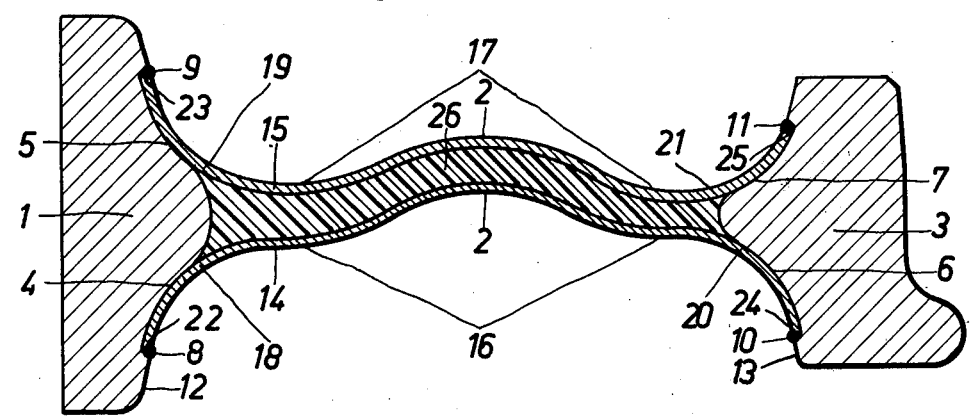
FIG. 3 is a view similar to FIGS. 1 and 2 showing an axial section through a track wheel having a radially undulated wheel disc.

Referring to the drawings herein which show three embodiments of the invention wherein like numerals represent like parts, there are shown track wheels having lightweight construction which differ only in that FIG. 1 shows a non-undulated wheel, FIG. 2 shows a wheel undulated tangentially and FIG. 3 shows a wheel undulated radially. The three exemplified embodiments are otherwise similar.

Each of the wheels comprises a hub 1 and a wheel rim 3. These are connected by the multi-walled construction of the invention. In FIG. 1 the wheel rim and the wheel hub are connected via disc 2 which consists of two molded walls 14, 15, the foundation of which is cup-shaped in the radial-axial plane. They are arranged so that their concave surfaces lie on the outside. Their central regions 16, 17 pass via uniformly curved transitional portions 18, 19, 20, 21 into edges 22, 23, 24, 25.

The hub 1 and the rim 3 have arcuate flanks, these flanks being designated 4, 5, 6 and 7. The flanks 4, 5 of the hub 1 and the flanks 6, 7 of the rim 3 are oppositely inclined and constructed as grooves for the inner or outer transitional portions 18, 19, 20, 21 of the walls. Their foundation passes via a step 8, 9, 10, 11 into the somewhat elevated surface 12, 13 of the inner side of the hub or the wheel rim 3.

In contrast to the embodiment shown in FIG. 1, the central region of the wheel disc of FIG. 2 is undulated in the tangential direction and according to FIG. 3, the central region or main portion of the wheel disc is undulated in the radial direction.

The shape and size of the two wheel disc walls 14, 15 are adapted to the shape and size of the hub 1, on the one hand, and the wheel rim 3, on the other, so that its transitional portions 18, 19, 20, 21 and its edges 22, 23, 24 and 25 about the flanks 4, 5, 6, and 7 and the steps 8, 9, 10 and 11 will press fit, i.e., the walls somewhat snap into position. As the walls 14, 15 consist of a relatively thin springy material, a safe and durable construction is guaranteed.

In order to improve the disposition of the walls into the hub or rim, the edges 22, 23, 24 and 25 can be further welded in the region of the steps 8, 9, 10 and 11 by means of a particularly undulated V seam at the wheel hub 1 or the wheel rim 3.

As a further improvement to dampen noise in the use of the wheel and to increase rigidity while giving protection against corrosion, the void or cavity between the walls 14, 15 of the wheel disc can be filled with a particularly soft filling material 26 which can be filled through an aperture (not shown) in a wheel disc wall such as wheel disc wall 14 or 15. This material can be made to flow through the void so as to fill it entirely and lend additional structural integrity thereto while not adding substantially to the overall weight.

It is to be understood that the invention can be similarly applied to a rubber-sprung wheel in which embedded rubber blocks are prestressed in opposite annular grooves of the wheel tire and wheel rim.

What is claimed is:

1. A wheel of lightweight construction useful as a railroad car wheel having a rigid hub portion and a rim portion, said hub portion connected to said rim portion by a pair of opposed spaced part concavely shaped wheel discs positioned back-to-back, each of which comprises a main portion running between said hub and said rim, which main portion has integral thereto at each end thereof an arcuately shaped transitional portion terminating in an edge, one of said transitional portions contiguously abutting and affixed to one of two oppositely inclined flanks of said hub, the other of said transitional portions contiguously abutting and affixed to one of two oppositely inclined flanks of said rim, the space between said opposed concavely shaped wheel discs being hollow, said hub and said rim each having facing parabolic contours on which said arcuately shaped transitional portions of said concavely shaped wheel discs are secured.

2. A wheel according to claim 1 wherein each of said flanks has a peripheral step at which a transitional portion of the disc is supported by its opposed edges.

3. A wheel according to claim 2 wherein on each side of said hub there is a stepped-out which receives one of the inner opposed transitional portions of the walls and on each side of said rim there is a stepped cut-out which receives one of the outer opposed transitional portions of the walls.

4. A wheel according to claim 3 wherein said steps are undercut.

5. A wheel according to claim 1 wherein said walls of said disc are supported by their integral arcuate transitional portions at the flanks by spring prestressing.

6. A wheel according to claim 1 wherein each of said edges is welded to the flank juxtaposed thereto.

7. A wheel according to claim 1 wherein said transitional portions are stuck to one of said hub and said rim at the region where said portions interface therewith.

8. A wheel according to claim 1 wherein the main portion of the disc is undulated in a tangential direction.

9. A wheel according to claim 1 wherein the main portion of said disc is undulated in the radial direction.

10. A wheel according to claim 1 wherein each of said hub and said rim have a parabolic shaped contour facing one another and the transitional portions of said disc contiguously abut the curved surfaces of the flanks thereof.

11. A wheel of lightweight construction useful as a railroad car wheel having a rigid hub portion and a rim portion, said hub portion connected to said rim portion by a pair of opposed spaced apart concavely shaped wheel discs position back-to-back, each of which comprises a main portion running between said hub and said rim, which main portion has integral thereto at each end thereof an arcuately shaped transitional portion terminating in an edge, one of said transitional portions contiguously abutting and affixed to one of two oppositely inclined flanks of said hub, the other of said transitional portions contiguously abutting and affixed to one of two oppositely inclined flanks of said rim, the space between said opposed concavely shaped wheel discs containing a soft filling material, said hub and said rim each having facing parabolic contours on which said arcuately shaped transitional portions of said concavely shaped wheel discs are secured.

* * * * *